United States Patent [19]

Katakura

[11] Patent Number: 5,201,313
[45] Date of Patent: Apr. 13, 1993

[54] ULTRASONIC FLOWMETER

[75] Inventor: Kageyoshi Katakura, Tokyo, Japan

[73] Assignee: Hitachi, Ltd., Tokyo, Japan

[21] Appl. No.: 860,563

[22] Filed: Mar. 30, 1992

Related U.S. Application Data

[63] Continuation of Ser. No. 575,572, Aug. 31, 1990, abandoned.

[30] Foreign Application Priority Data

Sep. 4, 1989 [JP] Japan ................. 1-227360

[51] Int. Cl.$^5$ .............................................. A61B 8/06
[52] U.S. Cl. ............................... 128/661.09; 73/861.25
[58] Field of Search ......... 128/662.05, 661.07–661.10; 73/861.25

[56] References Cited

U.S. PATENT DOCUMENTS

| | | | |
|---|---|---|---|
| 4,265,126 | 5/1981 | Papadofrongakis et al. ... | 128/661.09 |
| 4,930,513 | 6/1990 | Mayo et al. .................... | 128/661.09 |
| 4,979,513 | 12/1990 | Sakai et al. ..................... | 128/661.09 |
| 5,010,528 | 4/1991 | Ohtsuki et al. ............. | 128/661.09 X |

OTHER PUBLICATIONS

Japanese Journal of Medical Ultrasonics; 1982 No. 5 (Proceedings of the 40th Meeting, Tokyo May 23–25, 1982).
Newhouse, V. L. "Transverse Doppler Summary", Drexel University May 1989.

*Primary Examiner*—Francis Jaworski
*Attorney, Agent, or Firm*—Antonelli, Terry, Stout & Kraus

[57] ABSTRACT

A flowmeter based on an arrayed ultrasonic transducer operates to produce reception signals of a plurality of reception beams in parallel alignment from detected signals of reflection sound waves provided by transducer elements, performs moving target indication among the reception signals created by the repetition of transmission and reception, and thereafter performs Fourier transformation in the direction of beam alignment and direction of repetitive transmission and reception, and evaluates an axial velocity component and lateral (transverse) velocity component of a moving object from the resulting signal distribution.

9 Claims, 13 Drawing Sheets

F I G. 17
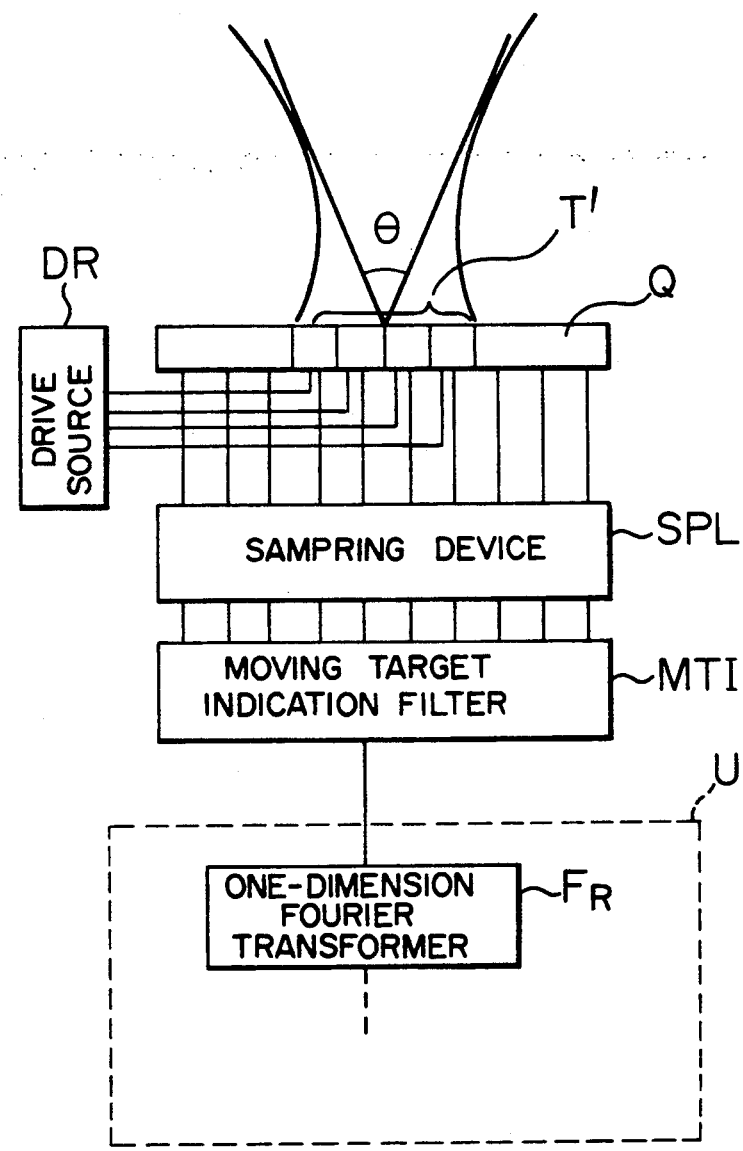

F I G. 19
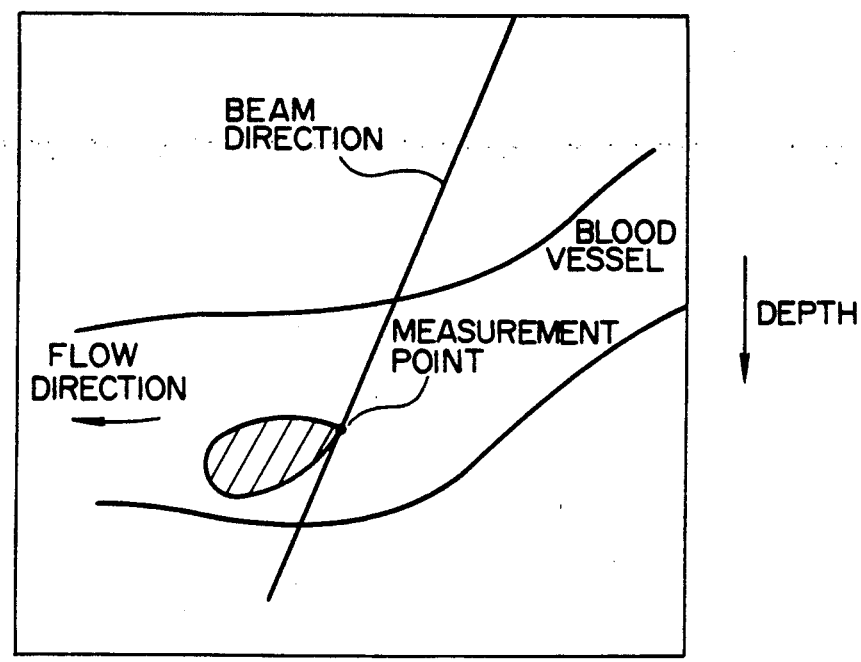
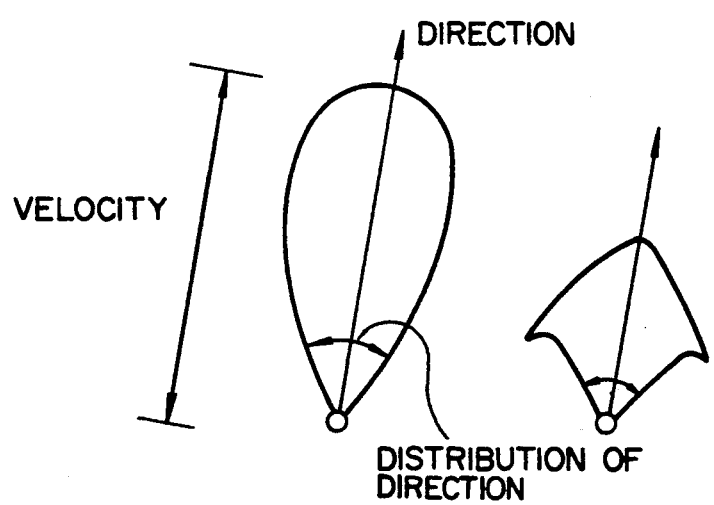

ULTRASONIC FLOWMETER

This application is a continuation of application Ser. No. 07/575,572, filed Aug. 31, 1990, and now abandoned.

BACKGROUND OF THE INVENTION

This invention relates to a pulsed ultrasonic flowmeter, i.e., a Doppler flowmeter, used in the fields of clinical medicine, under water measurement, and the like, and particularly to a flowmeter which is effective for the measurement of the blood flow in the heart.

Generally, the method of measuring the velocity of an object based on the Doppler shift of the reflected sound wave detects the component of velocity in the sound wave beam direction. In contrast, the method described in publication: Japanese Journal of Medical Ultrasonics, 40-A-56 (May 1982), pp. 395-396, calculates vectorial components of velocity from measured values based on a plurality of probes by utilization of the intersecting angle of beam.

However, the above-mentioned conventional technique bases the calculation on the measured velocities, providing only a mean value of velocity in the case of measurement of velocity in distribution, and it is not possible to calculate the spatial distribution.

A method of measuring the velocity at a right angle with the ultrasonic beam was unveiled in an article entitled "Transverse Doppler Summary" by V. L. Newhouse. This method detects a reflected wave from the measurement position with a transducer having a wide aperture which covers the measurement position in a relatively wide angle, and evaluates the flow rate in the transverse direction from the frequency spectrum of the detected signal. However, this method can not distinguish the heading of flow in the transverse direction, i.e., the polarity of velocity. Moreover, expansion of spectrum can be caused also by existence of particles staying from the main flow, and the accuracy of flow rate is not sufficient for the medical use.

SUMMARY OF THE INVENTION

Accordingly, an object of the present invention is to provide an ultrasonic flowmeter which is capable of measuring the distribution of the flow rate.

Another object of this invention is to provide an ultrasonic flowmeter which reveals the accurate magnitude and direction of flow, i.e., the heading of flow.

This invention is designed to process the signals from an array of transducer elements, thereby revealing the velocity distribution in all directions.

More specifically, the invention resides characteristically in an ultrasonic flowmeter which comprises an ultrasonic transducer including an array of elements, means of driving part of the transducer elements at a prescribed interval thereby to transmit an ultrasonic wave to a target, a parallel reception beam forming device which modifies the phase of the signals from the transducer elements to produce parallel reception signals derived from reception beams with different directivities, a sampling device which samples the parallel reception signals and stores the resulting signals, means of performing moving target indication through the differential processing among signals from the sampling device having a prescribed duration since transmission, a first one-dimension Fourier transform device which performs Fourier transformation in the directions of reception beams for the output of the moving target indication means, and a second Fourier transform means which performs Fourier transformation in the repetitive transmission direction for the successive outputs of the first Fourier transform device, and operates to evaluate the lateral velocity and axial velocity of a moving object in the target on the basis of the two-dimensional distribution of the outputs of the second Fourier transform means.

Other features of this invention will become apparent from the following detailed description.

BRIEF DESCRIPTION OF THE DRAWINGS

FIGS. 14 through 18 are block diagrams showing the embodiments of this invention; and FIG. 19 is a diagram showing the concept of display method as an example.

DESCRIPTION OF THE PREFERRED EMBODIMENTS

Figure 1:
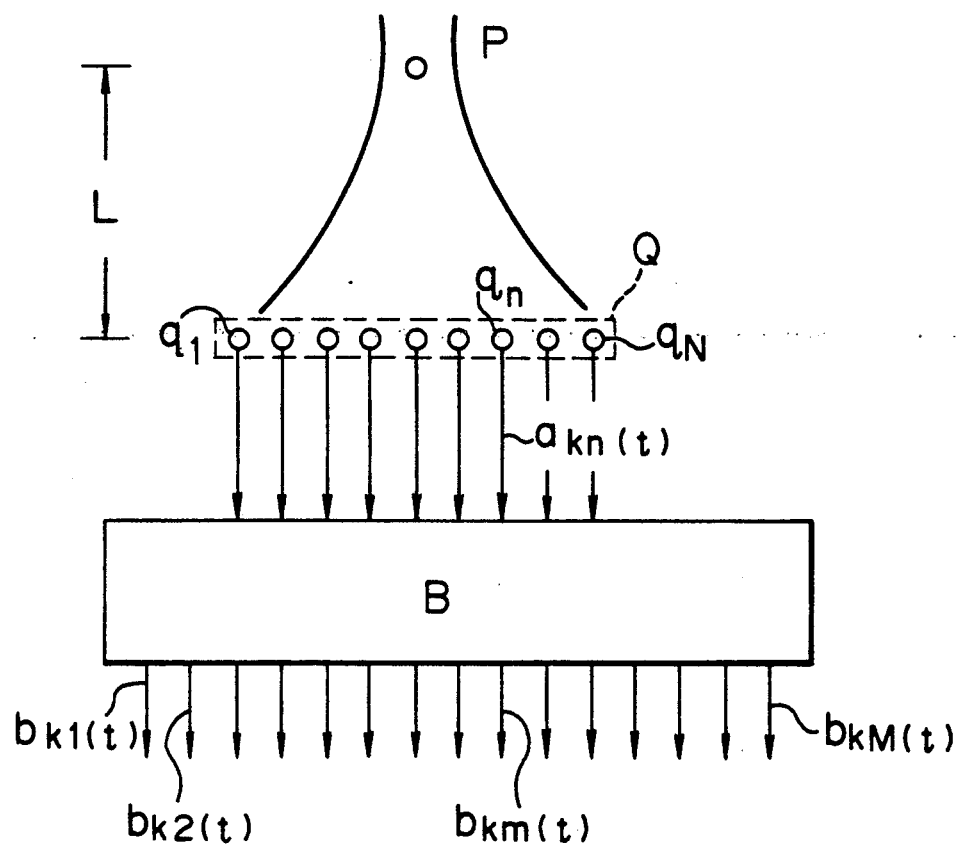
FIGS. 1 through 13 are diagrams used to explain the operation of this invention.

Among an array of transducer elements Q in FIG. 1, all or part of the elements transmit sound waves which focus on point P at a time interval of $t_k$. The distance from the array Q to the focal point P is L. The sound waves are reflected on the point P, and are received by elements $q_n$ of array Q which produces signals $a_{kn}(t)$.

Figure 2:
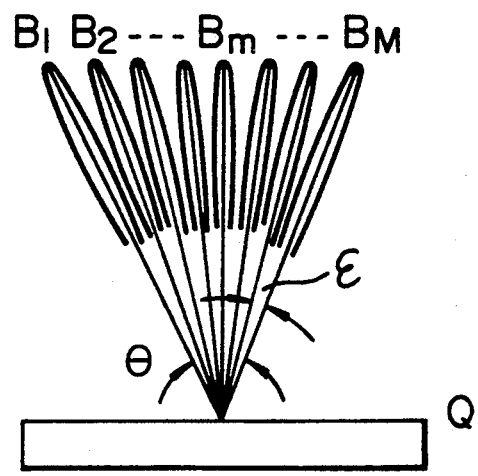
Figure 3A:
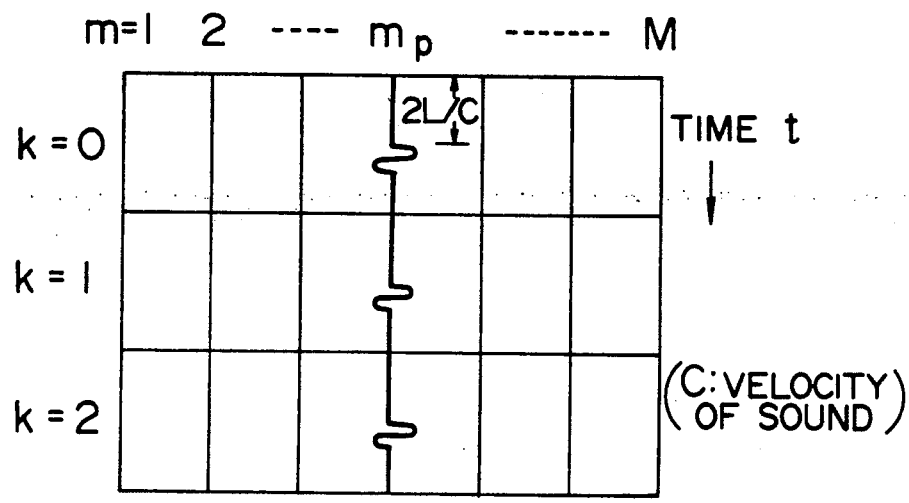

The signals $a_{kn}(t)$ are applied to a parallel beam forming device B, which produces simultaneously reception signals $b_{km}(t)$ (where m=1 to M) for the respective reception ultrasonic beams indicated by $B_1, B_2, \ldots, B_m, \ldots, B_M$ in FIG. 2 having a beam spacing of $\epsilon$. It is also possible to confine the significant range to $\theta$. In case a reflective object at point P is quiescent, a signal $b_{km}(t)$ appears as a reflection signal produced at the output of channel $m_p$ formed in the direction of P as shown in FIG. 3A, and the position of output channel is not varied by the number of repetitions of transmission. The time length since the transmission to the emergence of the reflection signal is the propagation time of the sound wave, and it is 2L/C where C is the velocity of sound.

Figure 3B:
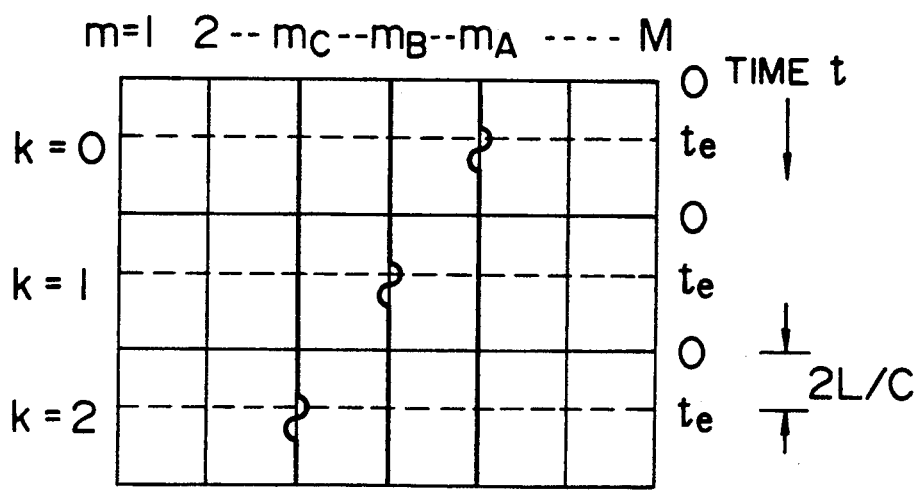
Figure 4:
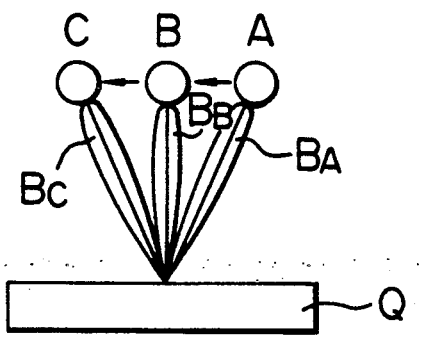
Figure 5:
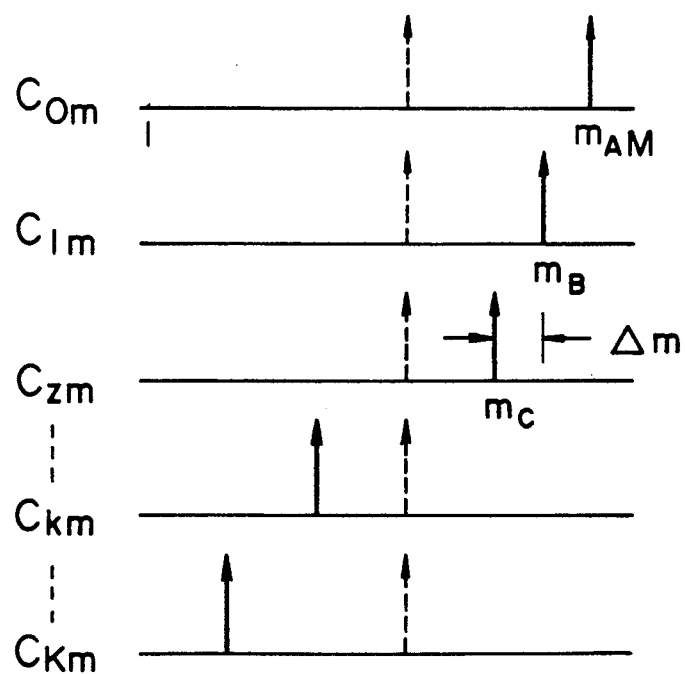

If the object moves to positions A, B and C at transmission times $t_0$, $t_1$ and $t_3$, respectively, as shown in FIG. 4, the signal $b_{km}(t)$ varies in channel of emergence of reflection signals as indicated by $m_A$, $m_B$ and $m_C$ in FIG. 3B. The amplitude and phase of $b_{km}(t)$ at time points $t_e$ ($t_e=2L/C$) of signal emergence of reception signals are measured and evaluated as complex values $C_{km}$. These values are plotted with respect to the beam positions m as shown in FIG. 5. With the amounts of movement in directions of transmission being $\Delta m$, FIG. 5 reveals the following relation.

$$C_{km} = C_0(m = k\Delta m) \tag{1}$$

For the amplitude $\hat{b}_{km}$ and phase $\phi_{km}$ of the reception signal $b_{km}(te)$ at time $t_e$, the $C_{km}$ is expressed based on FIG. 3B as:

$$C_{km} = \hat{b}_{km} \cdot e^{j\phi_{km}} = \hat{b}_{km} \cdot e^{j\phi} \tag{2}$$

and the movement of the case of FIG. 4 results in the same phase for all positions.

Figure 6:
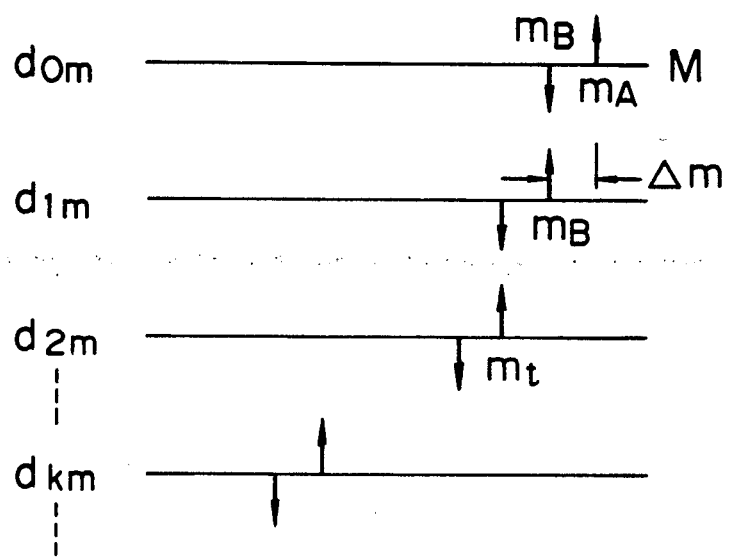

Components indicated by the dashed arrows in FIG. 5 are reflection signals from a quiescent object and they do not move. Accordingly, by conducting the differential process between adjacent signals in the same channel at each repetitive transmission, e.g., between $C_{1m}$ and $C_{2m}$, between $C_{2m}$ and $C_{3m}$, and so on, the moving target indication is achieved. Namely, the differential process produces an output $d_{km}$ ($d_{km}=C_{km}-C_{(k+1)m}$) as shown in FIG. 6, and the signals created by the quiescent object are removed.

Figure 7:
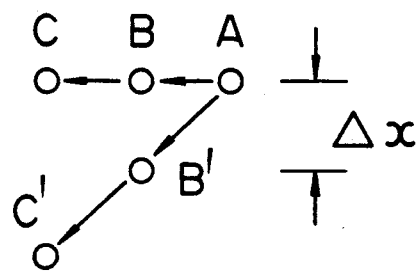
Figure 7:
Figure 8:
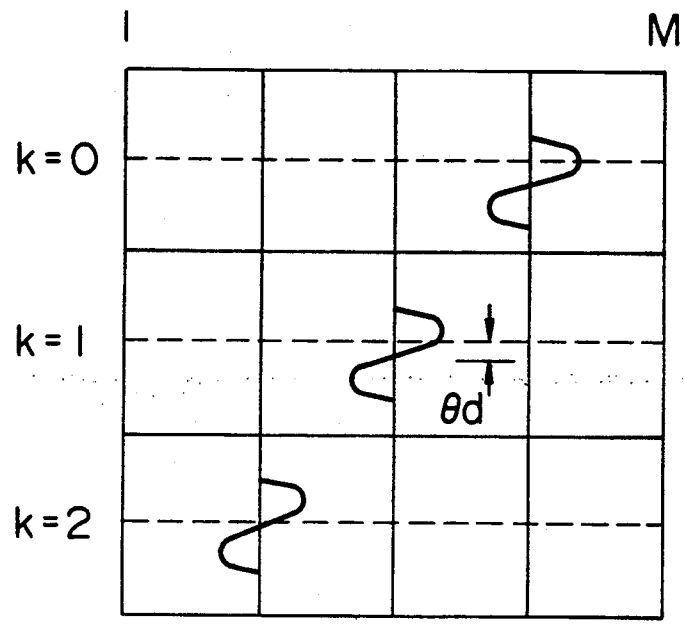

Although a complete transverse movement of a target is assumed in FIG. 4 for simplicity, it is accompanied by the movement in the depth direction in most practical cases as shown in FIG. 7, and the target moves to position B' at time point $t_1$ and to position C' at $t_2$ for example. In such a case, the signal has its phase at time point $t_e$ varying with the immediate distance to the reflective object as shown in FIG. 8. The amount of variation $\theta d$ is evaluated in terms of the axial velocity component Vr as:

$$\theta_d = 2\left(\frac{2\pi}{\lambda}\right)\Delta x = \frac{4\pi}{\lambda} Vr \cdot t_0 \qquad (3)$$

where $\lambda$ is the wavelength, and $t_0$ is the transmission interval ($t_0 = t_{k+1} - t_k$) Accordingly, when the $C_{km}$ is expanded to general movements represented by $\widetilde{C}_{km}$, it is given as:

$$\widetilde{C}_{km} = C_{km} \cdot e^{jk\phi d} \qquad (4)$$

and, in this case, the differential process output $\widetilde{d}_{km}$ is as follows.

$$\begin{aligned}\widetilde{d}_{km} &= \widetilde{C}_{km} - \widetilde{C}_{(k+1)m} \\ &= C_{km} \cdot e^{jk\theta d} - C_{(k+1)m} \cdot e^{jk(k+1)\theta d} \\ &= \{C_{km} - C_{(k+1)m} \cdot e^{j\theta d}\} e^{jk\theta d} \\ &= \{C_0(m+k\Delta m) - C_0[m+(k+1)\Delta m]e^{j\theta d}\} e^{jk\theta d} \\ &= d_{\theta\Delta}(m+k\Delta m)e^{jk\theta d}\end{aligned} \qquad (5)$$

where
$d_{\theta\Delta}(m) = C_0(m) + C_0(m+\Delta m)e^{j\theta d}$
$C_0(m) = C_{0m}$ The positions of emergence of the $\widetilde{d}_{km}$ in direction m are the same as shown in FIG. 6. The amount of movement $\Delta m$ in direction m in FIG. 6 is in correspondence to the target velocity $V_p$ in the direction as follows.

$$V_p = \frac{\Delta_m \cdot \epsilon \cdot L}{t_0} \qquad (6)$$

By conducting the Fourier transformation for the $\widetilde{d}_{km}$ in direction m, which is the direction of alignment of reception beams, the result $\widetilde{D}_k(\sigma)$ is given as follows.

$$\begin{aligned}\widetilde{D}_k(\sigma) &= \sum_1^M d_{\theta\Delta}(m+k\Delta m)e^{jk\theta d} \cdot e^{-j\sigma m} \\ &= e^{jk\theta d} \cdot e^{jk\sigma\Delta m} \cdot D_{\theta\Delta}(\sigma) \\ &= e^{jk(\theta d + \sigma\Delta m)} \cdot D_{\theta\Delta}(\sigma)\end{aligned} \qquad (7)$$

where $D_{\theta\Delta}(\sigma)$ represents the Fourier transformation of $d_{\theta\Delta}(m)$ as follows.

$$D_{\theta\Delta}(\sigma) = \sum_{m=1}^M d_{\theta\Delta}(m)e^{-j\sigma m} \qquad (8)$$

Another Fourier transformation for the $\widetilde{D}_k(\sigma)$ on k, i.e., the direction of repetitive transmission, yields $\widetilde{D}(\sigma, \rho)$ as follows.

$$\begin{aligned}\widetilde{D}(\sigma,\rho) &= \sum_{k=1}^k D_k(\sigma) \cdot e^{-jk\rho} \\ &= D_{\theta\Delta}(\sigma) \sum_{k=1}^k e^{jk(\theta d + \sigma\Delta m - \rho)} \\ &= D_{\theta\Delta}(\sigma) E(\sigma,\rho)\end{aligned} \qquad (9)$$

Figure 9:
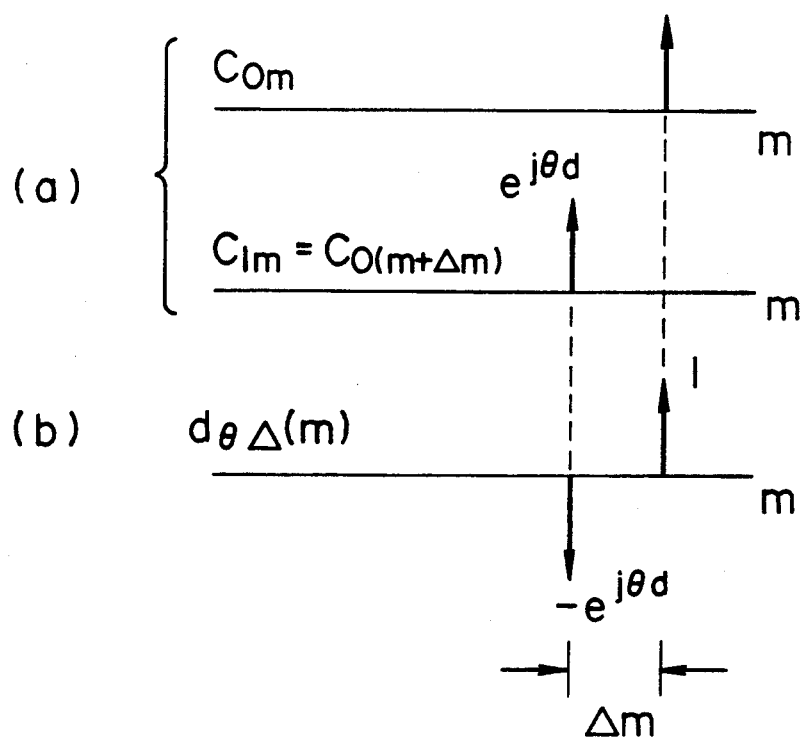

The $D_{\theta\Delta}(\sigma)$ is the result of Fourier transformation for the $d_{\theta\Delta}(m)$, which varies from $C_{0m}$ and $C_{1m}$ shown by (a) in FIG. 9 to that shown by (b) in FIG. 9, and this Fourier transformation results as follows.

$$D_{\theta\Delta}(\sigma) = 1 - e^{j(\Delta m\sigma + \theta d)} \qquad (10)$$

Figure 10:
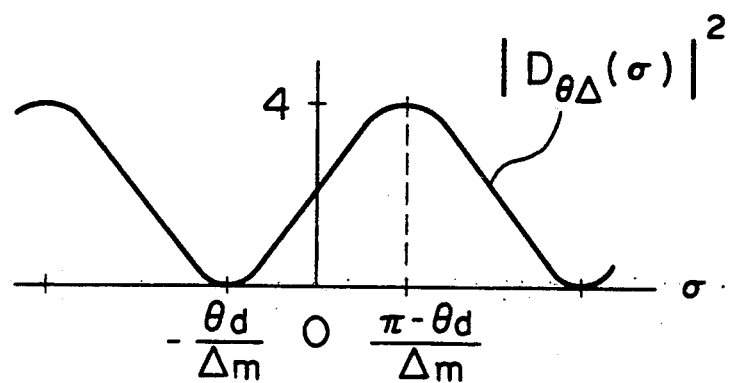

It has a power spectrum of $|D_{\theta\Delta}(\sigma)|^2$ as follows.

$$\{D_{\theta\Delta}(\sigma)\}^2 = 2\{1 - \cos(\Delta m\sigma + \theta_d)\} \text{tm} \qquad (11)$$

and it is as shown in FIG. 10. The power spectrum has a peak value at position $(\pi - \theta_d)/\Delta m$, and this position moves in accordance with the transverse velocity $\Delta m$ and axial velocity $\theta_d$. The spectrum has a null point at the position which meets $\Delta m\sigma_0 + \theta_d = 0$, where $\sigma_0 = -\theta_d/\Delta m$.

Next, the term of cummulative summation $(\sigma, \rho)$ of the $\widetilde{D}(\sigma, \rho)$ will be examined.

$$E(\sigma,\rho) = \sum_{k=1}^k e^{jk(\theta d + \sigma\Delta m - \rho)} \qquad (12)$$

The above is generally the sum of irregular phase components, and is small in value.

$$\theta_d \sigma \Delta m - \rho \approx 0 \qquad (13)$$

Figure 11:
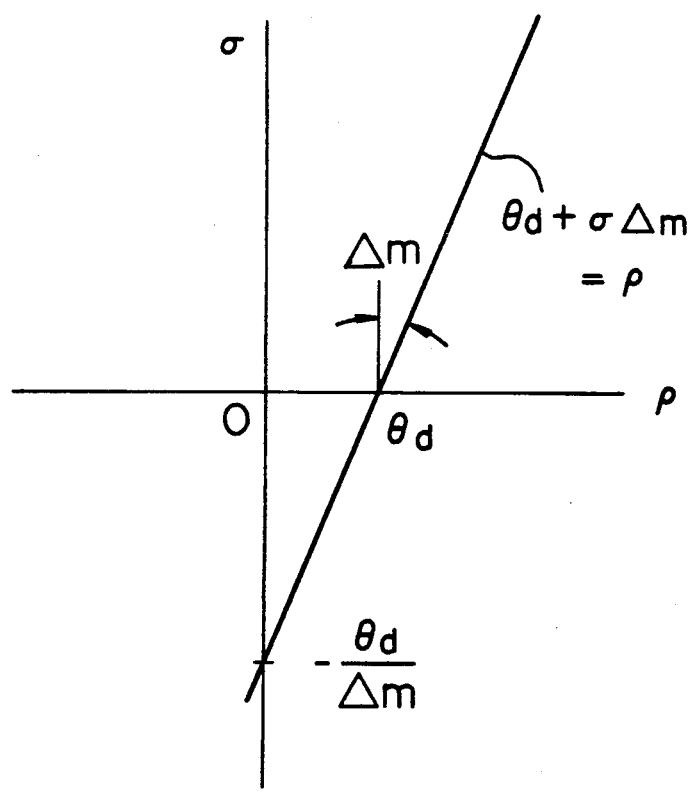

In the above special case, it represents the sum of in-phase components, and $E(\sigma, \rho)$ has a large value. When it is plotted on the $\sigma$-$\rho$ plane, it presents a large output only on a specific line as shown in FIG. 11. The gradient of the line relates to the transverse velocity $\Delta m(V\rho)$, and the intersection with the $\rho$ axis corresponds to the axial velocity $\theta_d(V_r)$.

Figure 12:
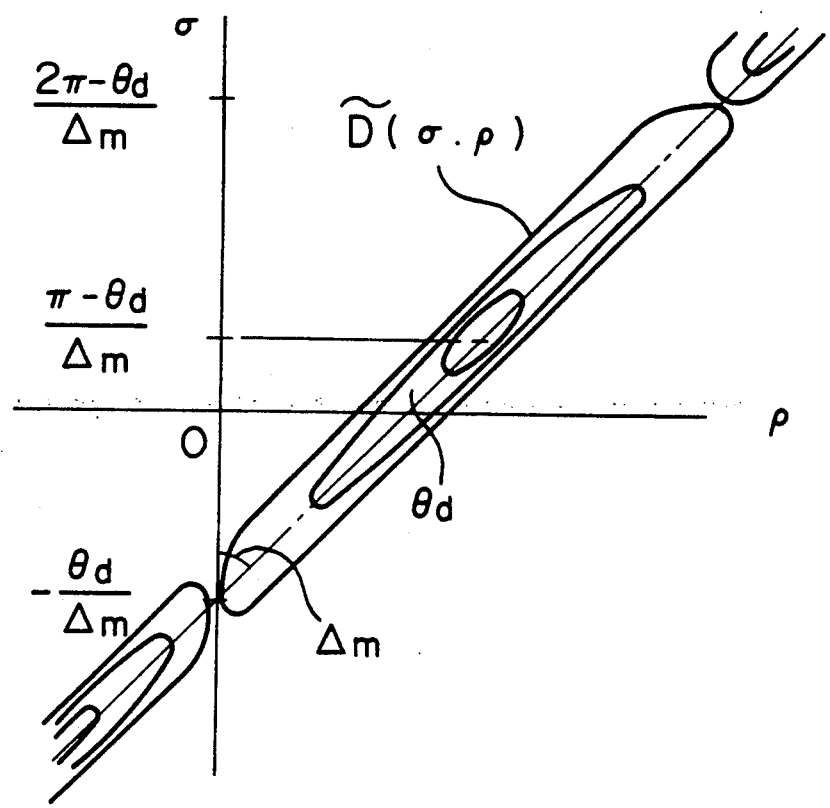

In consequence, the $\widetilde{D}(\sigma, \rho)$ which is given as a product of the $D_{\theta\Delta}(\sigma)$ and $E(\sigma, \rho)$ is as shown in FIG. 12, and by using the $\Delta m$ and $\theta_d$ measured on the diagram, the transverse velocity $V_p$ and axial velocity $V_r$ are measured independently to present its vectorial velocity.

$$\sigma_0 = -\theta_d/\Delta m \qquad (14)$$

$$\theta_d + \sigma_0\Delta m - \rho_0 = 0 \qquad (15)$$

With the relation pertinent to the null point of the $D_{\theta\Delta}(\sigma)$ given by equation (14) and the relation pertinent to the maximum value of the $E(\sigma, \rho)$ given by equation (15) being satisfied simultaneously, the $\rho_0$ becomes zero, and the null point of the $D_{\theta\Delta}(\sigma)$ at the position where the $E(\sigma, \rho)$ exists is as follows.

$\sigma = -\theta_d/\Delta m$ $\rho = 0$

Accordingly, the null point always exists on the intersection of the line of $\theta_d + \sigma_0\Delta m - \rho_0 = 0$ and the axis of $\rho = 0$, as shown in FIG. 12.

The $D_{\theta\Delta}(\sigma)$, which is also a function of the $\theta_d$ and $\Delta m$, is determined uniquely from the values of $\theta_d$ and $\Delta m$. On this account, taking a two dimensional convolution integration between the received information $\tilde{D}(\sigma,\rho)$ and the known function $D_{\theta\Delta(\sigma)}$ *in the vicinity of the line given by equation* (16) on which $E(\sigma\rho)$ exists, and conducting an optimizing filtering process, the detection output is obtained which provides the maximum signal-to-noise ratio as a function of the $\theta_d$ and $\Delta m$ corresponding to the target velocity.

$$\theta_d + \sigma\Delta m - \rho = 0 \qquad (16)$$

Integration is conducted on the line for the sake of simplicity as follows.

$$R(\theta_d, \Delta m) = \int_{-\pi}^{\pi} \tilde{D}_{\theta\Delta}(\sigma) D(\sigma,\rho) d\sigma \qquad (17)$$

$$= \int_{-\pi}^{\pi} \tilde{D}_{\theta\Delta}(\sigma) D(\sigma, \theta_d + \sigma\Delta m) d\sigma$$

where $\rho = \theta_d + \sigma\Delta m$

Figure 13:
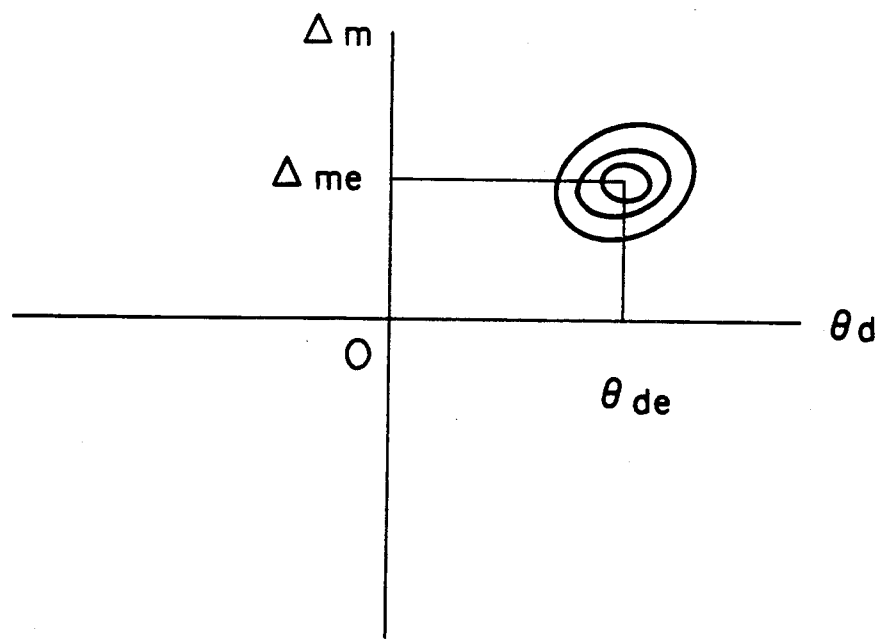

The result gives a peak value at the position corresponding to the target velocity as shown in FIG. 13. The values of $\theta_{de}$ and $\Delta_{me}$ which provide this position are the measured values representing the lateral and axial velocities.

Since this method is based entirely on the linear process, when the target velocity is distributed, the $R(\theta_d, \Delta m)$ is distributed by itself in correspondence to the distribution of the flow rate.

The resolution of this method, particularly the directional resolution is higher when the $\epsilon$ is smaller and $\theta$ is larger. On this account, it is desirable to make the exposure range of ultrasonic wave wider and each reception beam formed on B narrower. An effective manner to meet these conditions is to make the transducer aperture smaller than the total aperture used for reception.

An embodiment of this invention will be described with reference to FIG. 14.

Figure 14:
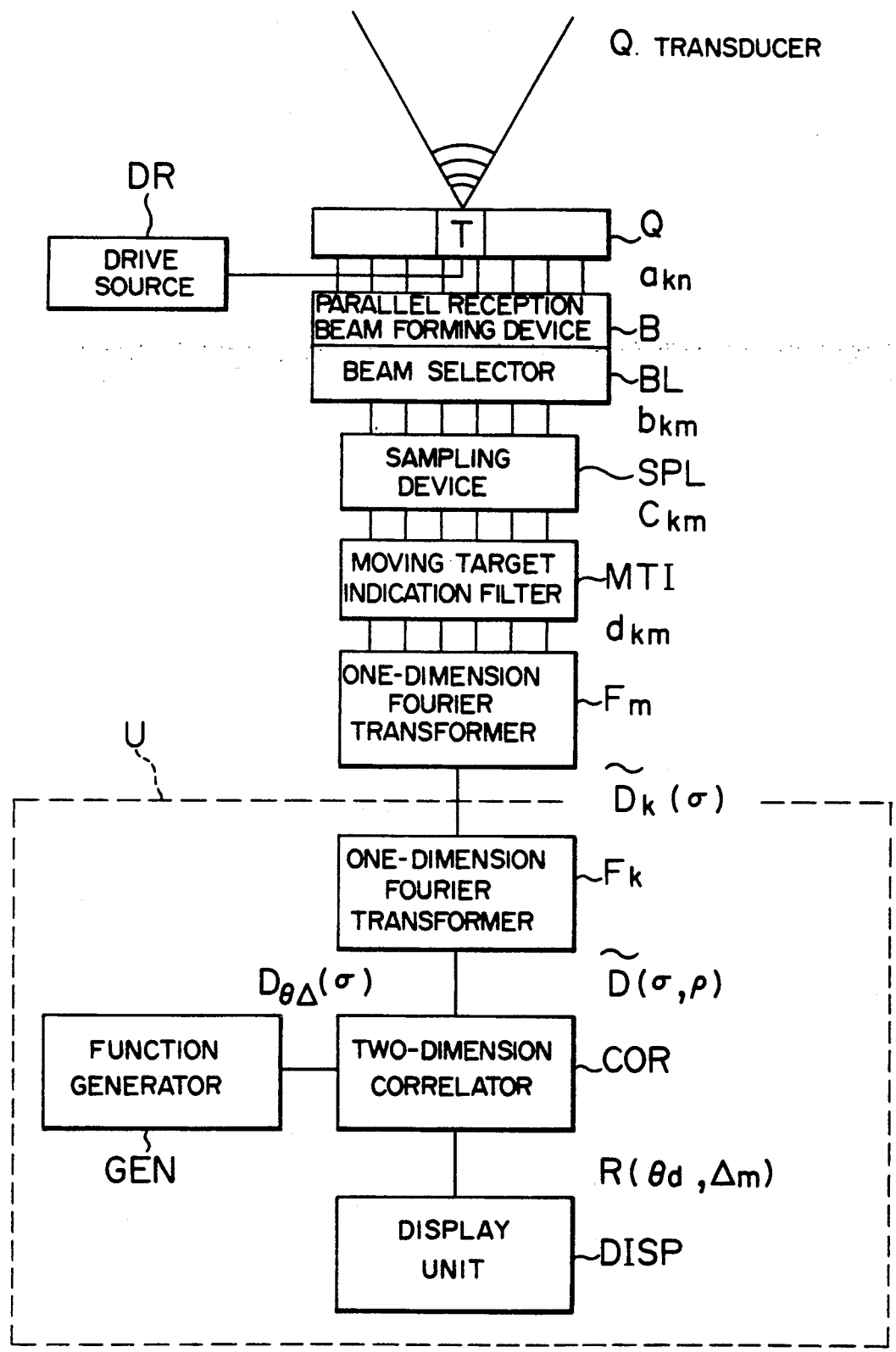

Indicated by Q in FIG. 14 is a transducer made up of N pieces of arrayed elements. Part T of the elements are driven by a drive source DR so that a pulsed sound wave is transmitted repeatedly at a transmission interval of $t_R$ to a wide space (in the angle $\theta$ shown in FIG. 2 or more). A reflection signal from a target derived from the transmitted sound wave is received by the transducer Q, and resulting signals of N in number are processed by a parallel reception beam forming device B, which produces reception signals in correspondence to sound beams. The parallel reception beam forming device is formed of a parallel integration of well-known beam forming devices which delay signals of transducer elements individually and sum the signals thereby to produce reception signals for the reception beam having directivities in desired directions. The beams have a directional difference by an angle of $\epsilon$ between adjacent ones as shown in FIG. 2.

In this embodiment, the beams have a virtually equal focal depth in order to accomplish high accuracy flow rate measurement for a specific depth. A beam selector BL selects reception signals $b_{km}(t)$ (where $m = 1$ to M) of M in number, which represent reception beams of M in number within the range of the angle $\theta$ as shown in FIG. 2, from among the reception signals. The subscript k indicates the reception signal number based on the count of repetitive transmissions. The variable t indicates the time length expended since transmission.

The signals are sampled by a sampling device SPL and stored. The SPL output $C_{km}$ for each transmission and reception is assumed as a function of time, and this reflection signal is suppressed if the target is fixed by means of a moving target indication filter MTI which performs a differential process between adjacent $C_{km}$ outputs in the k direction. The MTI output $d_{km}$ is treated as a function of m, and it is rendered Fourier transformation by a one-dimension Fourier transform device $F_m$. The output $\tilde{D}_k(\sigma)$ of the $F_m$ is rendered Fourier transformation as a function of k by a similar one-dimension Fourier transform device $F_k$ to obtain $\tilde{D}(\sigma,\rho)$. The $\tilde{D}(\sigma, \rho)$ presents the intensity distribution as shown in FIG. 12 on the $\sigma$-$\rho$ plane, as has been explained in connection with the formulas (9) to (13), and reveals the axial velocity component $\theta_d$ of a moving object from the $\rho$-cut of the line appearing on the distribution and the transverse velocity component $\Delta m$ from the gradient of the line. Although the output $\tilde{D}(\sigma,\rho)$ of the Fourier transform device $F_k$ may be displayed on a two-dimensional plane, this embodiment further proceeds to the calculation of a two-dimensional correlative function $R(74_d, \Delta m)$ between the $\tilde{D}(\sigma,\rho)$ and $D_{\theta\Delta}(\sigma)$ given to all velocity components by means of a two-dimension correlation device COR. Indicated by GEN is a function generator which generates $D_{\theta\Delta}(\sigma)$ in correspondence to values of $\theta_d$ and $\Delta m$. The position $(\theta_{de}, \Delta_{me})$ of the peak value of the $R(\theta_d, \Delta m)$ represents the directional velocity $V_\rho$ and axial velocity $V_r$ of the target, as has been explained in connection with FIG. 13. The display unit DISP displays the $R(\theta_d, \Delta m)$ on the two-dimensional plane or reads out the measured value of the position $(\theta_{de}, \Delta_{me})$ of the peak value of the $R(\theta_d, \Delta m)$.

Figure 15:
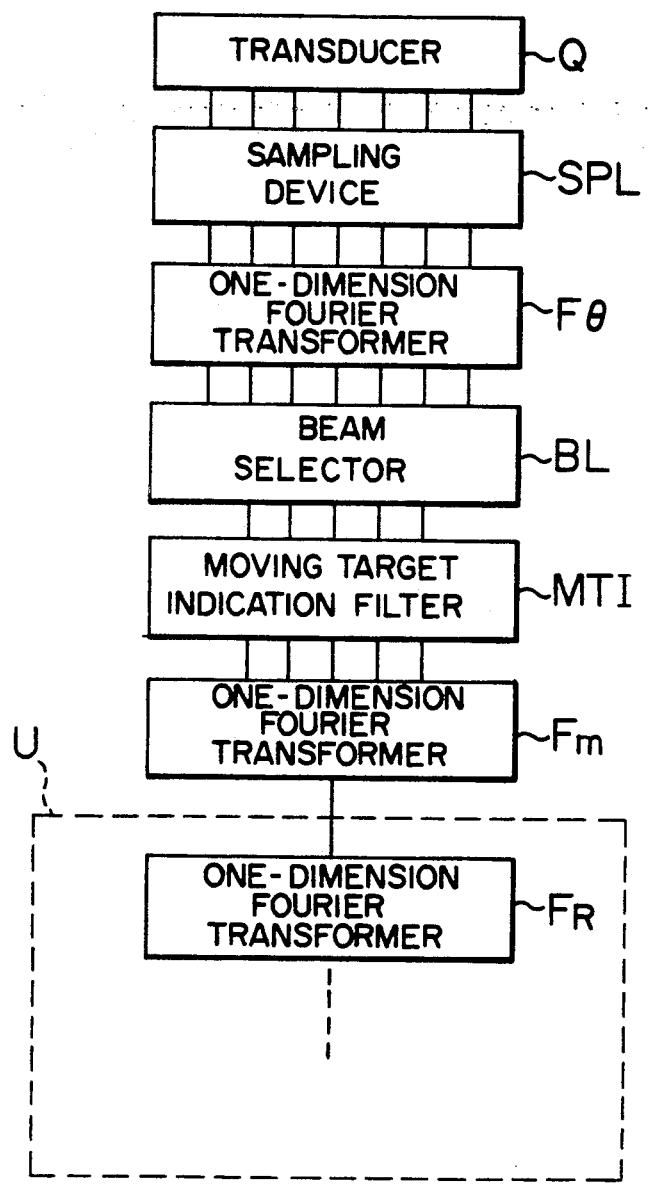

The beam forming process by the parallel reception beam forming device B in FIG. 14 is known to be a Fourier transformation pertaining to the space. Accordingly, it is possible to replace the B in FIG. 14 with a one-dimensional Fourier transform device $F_\theta$. In this case, the Fourier transformation process is generally conducted for sampled values, and a sampling device SPL which samples the reception signals and stores the signals is placed in front of the one-dimensional Fourier transform device $F_\theta$ as shown in FIG. 15. The arrangement of FIG. 15 is designed such that reception signals $A_{nk}(t)$ of transducer elements of N in number are sampled by the sampling device, and are rendered the Fourier transformation with $F_\theta$ in direction n and conducted through the beam selector BL, thereby producing outputs which are equivalent to the outputs $C_{km}$ of the sampling device SPL in FIG. 14. In FIG. 15, the arrangement of a velocity analyzing device U in the rear of the one-dimension filter $F_m$ and one-dimension filter $F_k$ is identical to that of FIG. 14.

Figure 16:
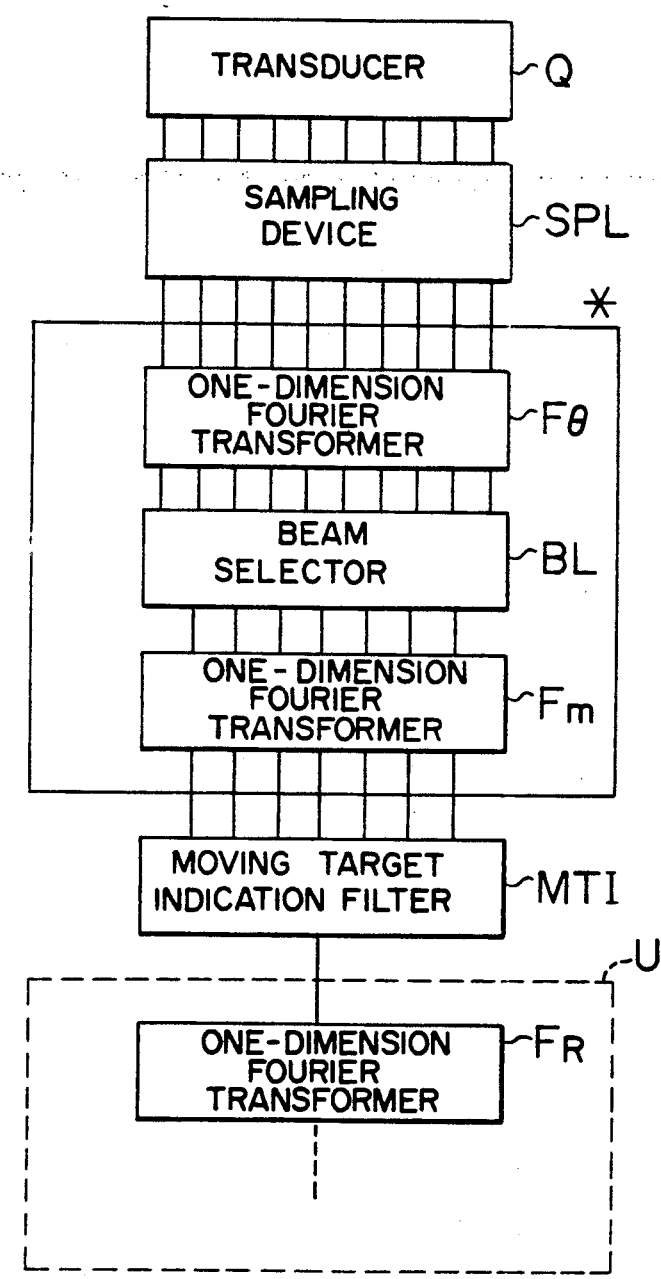

The MTI process of FIG. 15 has no difference before and after the process by the $F_m$. Accordingly, even with the one-dimension Fourier transform device $F_m$ being connected to the front of the moving target indication filter MTI as shown in FIG. 16, the same operation as of the case of FIG. 15 takes place. It will be appreciated from this figure that the section marked by "*" in FIG. 16 is Fourier transformation for twice and it has basically identical to no operation, but merely confines the range of attention to the $\theta$ using the BL. On this basis, partial element group T' among the transducer elements are activated to transmit the sound wave to the region $\theta$ and the reflection signals from this region are received, as shown in FIG. 17, whereby the beam selector BL can be eliminated. The arrangement of FIG. 17 may be such that the reception signals $a_{k1}, \ldots, a_{kn}$ from the transducer elements sampled by the sampling device SPL are introduced to the moving target indication filter MTI, and the output of the MTI can be directly introduced to the one-dimension Fourier transform device in the block U. Output of $F_k$ will the same as FIG. 12, with element location for its vertical axis.

Figure 18:
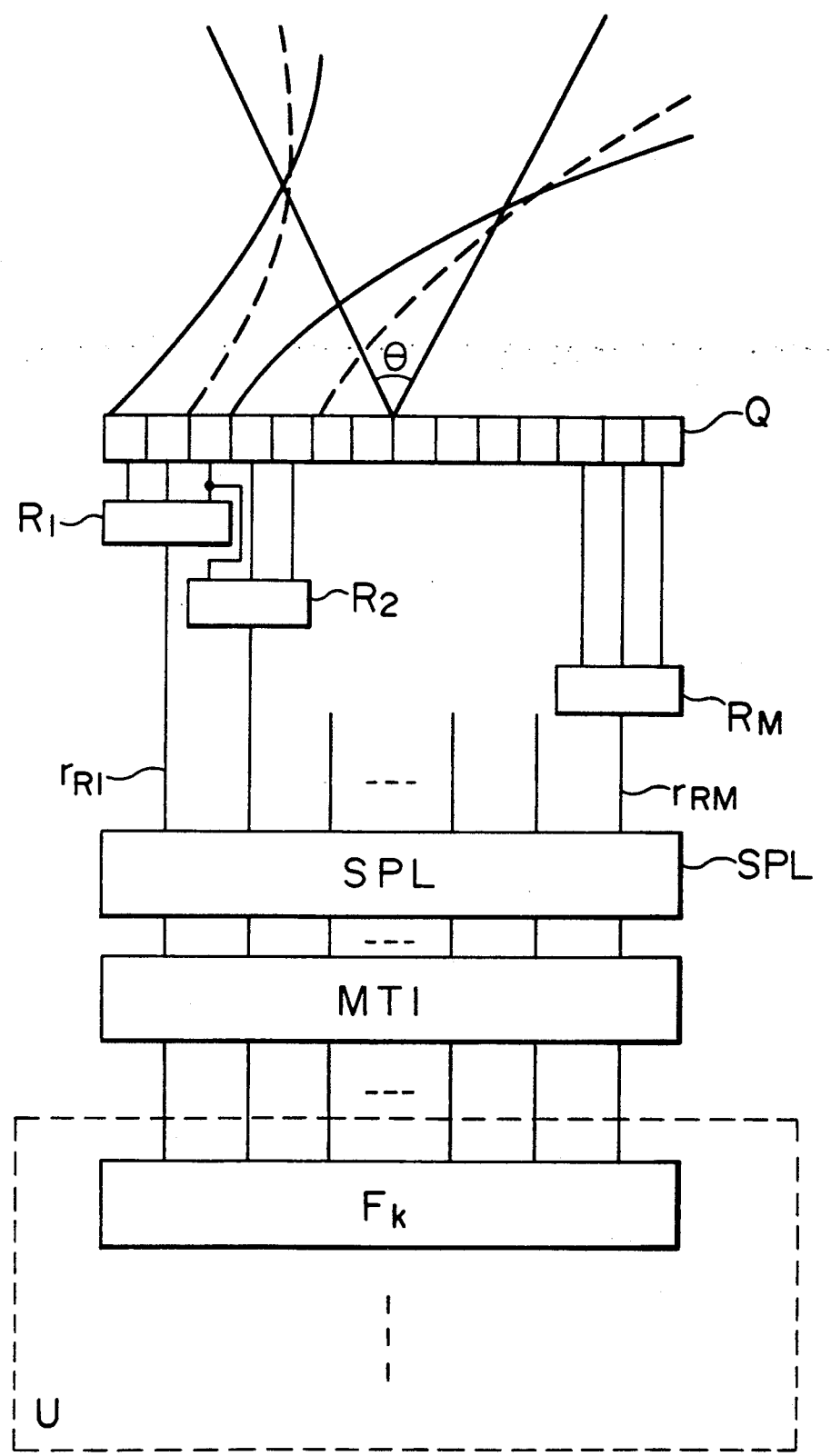

Furthermore, as shown in FIG. 18, the reception signals $a_{k1}, \ldots, a_{kn}$ from the transducer elements are separated into groups through partial apertures, with these groups being connected to respective beam forming rectifying devices $R_1$-$R_M$ for implementing the rectification summation, and outputs of $r_{k1} \ldots r_{kM}$ indicative of a plurality of beams in the range of the region $\theta$ are sampled with the sampling device SPL in the same manner as in the case of FIG. 17 before conducting the successive processes.

Also in the embodiments of FIGS. 16 to 18, the arrangement of the velocity analyzing device U which calculates the lateral velocity $V_\rho$ and distant velocity $V_r$ is completely identical to the embodiment of FIG. 14. The order of disposition of the arrangement can be changed arbitrarily. Instead of using the two-dimension correlator COR, the distribution of $\tilde{D}(\sigma, \rho)$ may be displayed intact. The SPL is arranged using a usual sample-holding circuit and A/D converter, or a possible alternative arrangement is a sampling device of the type of phase comparison which performs multiplication with a reference signal and low band filtering, and an improved s/n is expected in this case.

Each of the foregoing embodiments provides two-direction components of velocity, and it reveals the direction and flow rate and the distribution of directions, of a blood flow in a live body, for example. Consequently, it becomes possible to display a measured point on the two-dimension tomographic plane and the flow rate, direction and its distribution at the measured point, as shown in FIG. 19.

Thus, flow rate and the direction of the flow in a two-dimensional plane, i.e. two-dimensional vector of flow can be accurately detected. Moreover, three-dimensional vector of flow can also be detected by employing a two-dimensional transducer array and two-dimensional Fourier transformers.

I claim:

1. An ultrasonic flowmeter comprising: a transducer made up of an array of elements; means for driving part of said transducer elements in a prescribed interval thereby to repeatedly transmit an ultrasonic wave to a target; a parallel reception beam forming means for rectifying phases of signals from said transducer elements and for producing parallel reception signals derived from reception beams with different directivities; a sampling means for sampling each of said parallel reception signals and for storing said sampled signals; filtering means for performing moving target indication through a differential process across signals having a certain time duration since transmission among the signals from said sampling means; a first one-dimension Fourier transform means for performing Fourier tranformation for the output of said filtering means in the direction of alignment of the reception beams; and a second Fourier transform means for performing Fourier transformation sequentially for the outputs of said first Fourier transform means in the direction of repetitive transmission so that lateral velocity and axial velocity of a moving object in said target are obtained form a two-dimensional distribution of the outputs of said second Fourier transform means.

2. An ultrasonic flowmeter according to claim 1, wherein said parallel reception beam forming means includes means for forming a plurality of reception beams having different directions simultaneously.

3. An ultrasonic flowmeter according to claim 1, wherein said parallel reception beam forming means includes means for forming a plurality of reception beams having an equal focal distance and different focal directions simultaneously.

4. An ultrasonic flowmeter according to claim 1, wherein said parallel reception beam forming means comprises a one-dimension Fourier transform means for performing Fourier transformation for each of said reception signals received by said transducer elements in the direction of alignment of said transducer elements.

5. An ultrasonic flowmeter according to claim 1 further comprising means for obtaining distribution of velocity vectors on a two-dimensional plane from the outputs of said second Fourier transform means and for displaying the distribution on a two-dimension screen.

6. An ultrasonic flowmeter comprising: a transducer made up of an array of elements; means for driving part of said transducer elements in a prescribed interval thereby to repeatedly transmit an ultrasonic wave to a target; a parallel reception beam forming means for modifying a phase of signals from said transducer elements and for producing parallel reception signals derived from reception beams with different directivities; a sampling means for sampling each of said parallel reception signals and for storing said sampled signals; filtering means for performing moving target indication through a differential process across signals having a certain time duration since transmission among the signals from said sampling means; a first one-dimension Fourier means for performing Fourier transformation for the output of said filtering means in the direction of alignment of the reception beams; a second Fourier transform means for performing Fourier transformation sequentially for the outputs of said first Fourier transform means in the direction of repetitive transmission; function generation means for generating a prescribed function of space frequency $\sigma$ in correspondence to all measurable lateral velocities and axial velocities; and two-dimensional correlation means for evaluating a two-dimensional correlation function between the output of said second Fourier transform means and the output of said function generation means; wherein axial velocity and distant velocity are evaluated from the position of a peak value of the output distribution of said two-dimensional correlation means.

7. An ultrasonic flowmeter comprising: means for repeatedly transmitting an ultrasonic wave to a target; a transducer made up of an array of transducer elements, each of said transducer elements for receiving ultrasonic waves reflected from said target; sampling means for sampling signals from each of said transducer elements; Fourier transformer means for performing Fourier transformation on said sampled signals in the direction of repetitive transmission; means for deriving flow velocity of said target and the direction thereof for enabling analyzing the output of said Fourier transformer means on a multi-dimensional plane having a first axis indicating location of the output of said Fourier transformer means and a second axis indicating location of said transducer elements.

8. An ultrasonic flowmeter comprising:
   means for repetitive transmission of ultrasonic waves;
   receiving means including a receiving array transducer for receiving reflection waves of the transmitted ultrasonic waves;
   converting means responsive to the receiving means for converting received signals into phase and amplitude information;
   multi-dimensional function means responsive to the converting means for converting the received signals with the phase and amplitude information into a multi-dimensional function with parameters related to the specific location and time of each transmission of the ultrasonic waves; and
   multi-dimensional velocity vector means responsive to the multi-dimensional function means for converting the multi-dimensional function into a multi-dimensional velocity vector.

9. An ultrasonic flowmeter according to claim 8, wherein the ultrasonic flowmeter is utilized for measuring blood flow and the multi-dimensional velocity vector means provides a multi-dimensional velocity vector of the blood flow to be measured.

* * * * *